United States Patent
Sturm

(10) Patent No.: US 8,232,873 B2
(45) Date of Patent: Jul. 31, 2012

(54) DRIVER ASSISTANCE SYSTEM AND METHOD FOR OUTPUTTING AT LEAST ONE PIECE OF INFORMATION

(75) Inventor: Christoph Sturm, Haar (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 940 days.

(21) Appl. No.: 11/926,244

(22) Filed: Oct. 29, 2007

(65) Prior Publication Data

US 2008/0084287 A1 Apr. 10, 2008

Related U.S. Application Data

(63) Continuation of application No. PCT/EP2006/003854, filed on Apr. 26, 2006.

(30) Foreign Application Priority Data

Apr. 28, 2005 (DE) .......................... 10 2005 019 705

(51) Int. Cl.
*B60Q 1/00* (2006.01)
*G06F 7/00* (2006.01)

(52) U.S. Cl. ...................... 340/438; 340/439; 340/425.5; 701/36; 701/48

(58) Field of Classification Search ............... 340/438
See application file for complete search history.

(56) References Cited

U.S. PATENT DOCUMENTS

| | | | |
|---|---|---|---|
| 5,032,821 A * | 7/1991 | Domanico et al. ............ | 340/440 |
| 6,374,168 B1 | 4/2002 | Fujii | |
| 2003/0128123 A1 * | 7/2003 | Sumiya et al. ............ | 340/573.1 |
| 2004/0075582 A1 * | 4/2004 | Bergan et al. ................ | 340/936 |
| 2004/0209594 A1 * | 10/2004 | Naboulsi .................... | 455/404.1 |
| 2004/0262063 A1 * | 12/2004 | Kaufmann et al. ........... | 180/169 |
| 2005/0168331 A1 * | 8/2005 | Gunderson ................... | 340/468 |
| 2005/0190080 A1 * | 9/2005 | Flick ............................ | 340/989 |
| 2006/0044119 A1 | 3/2006 | Egelhaaf | |
| 2006/0071764 A1 * | 4/2006 | Lynch .......................... | 340/435 |
| 2007/0115105 A1 | 5/2007 | Schmitz | |

FOREIGN PATENT DOCUMENTS

| | | |
|---|---|---|
| DE | 30 05 644 A1 | 8/1981 |
| DE | 199 62 800 A1 | 6/2000 |
| DE | 101 49 285 A1 | 4/2003 |
| DE | 103 15 564 A1 | 10/2004 |
| DE | 103 26 358 A1 | 12/2004 |
| DE | 103 42 528 A1 | 4/2005 |
| DE | 103 43 178 A1 | 4/2005 |

(Continued)

OTHER PUBLICATIONS

International Search Report dated Aug. 1, 2006 with English translation of relevant portion (Six (6) pages).

(Continued)

*Primary Examiner* — George Bugg
*Assistant Examiner* — Jack Wang
(74) *Attorney, Agent, or Firm* — Crowell & Moring LLP

(57) ABSTRACT

A driver assistance system and method outputs, as a function of certain conditions, at least one piece of information, in particular a warning, to the driver of a motor vehicle. The driver assistance system can be transferred into a demonstration and/or learning mode, in which the conditions applied for outputting the piece of information are different from the normal mode of operation.

19 Claims, 1 Drawing Sheet

FOREIGN PATENT DOCUMENTS

| | | |
|---|---|---|
| DE | 103 44 299 A1 | 4/2005 |
| EP | 1 424 261 A2 | 6/2004 |
| EP | 1 630 756 A1 | 3/2006 |
| JP | 9-264978 A | 10/1997 |
| WO | WO 2004/068439 A1 | 8/2004 |

OTHER PUBLICATIONS

German Search Report dated Jan. 19, 2006 with English translation of relevant portion (Nine (9) pages).

* cited by examiner

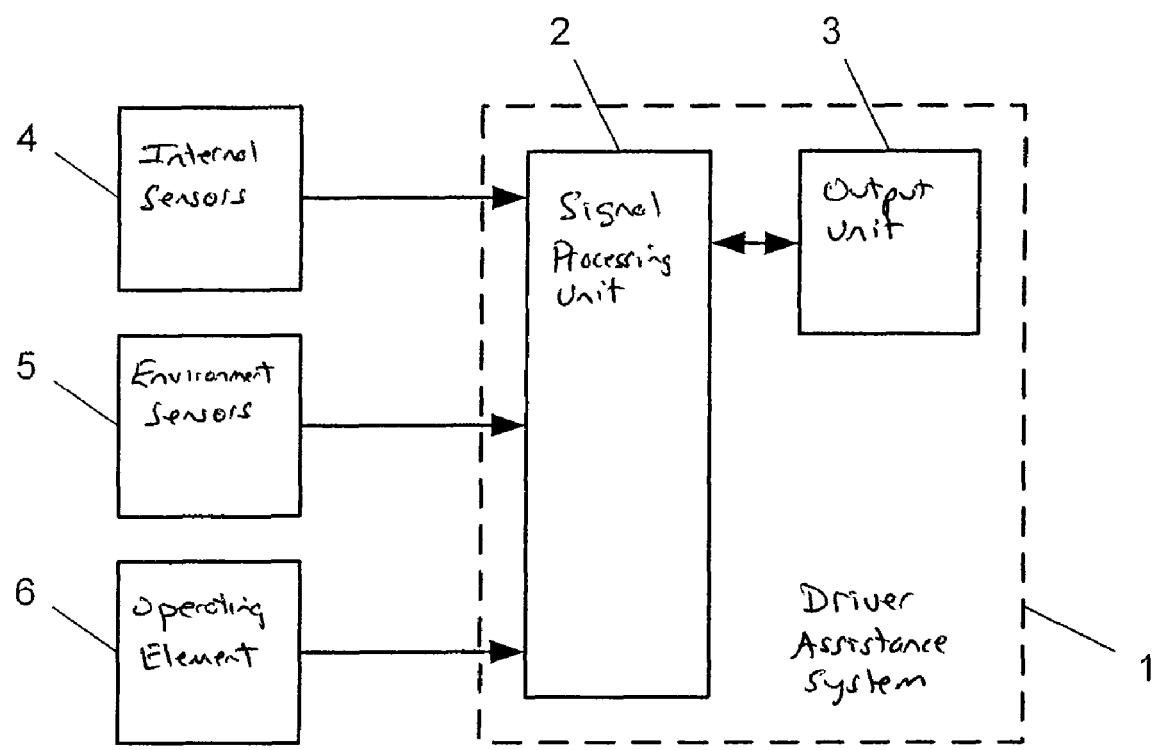

DRIVER ASSISTANCE SYSTEM AND METHOD FOR OUTPUTTING AT LEAST ONE PIECE OF INFORMATION

CROSS-REFERENCE TO RELATED APPLICATIONS

This application is a continuation of PCT International Application No. PCT/EP2006/003854, filed on Apr. 26, 2006, which claims priority under 35 U.S.C. §119 to German Application No. 10 2005 019 705.1, filed Apr. 28, 2005, the entire disclosures of which are expressly incorporated by reference herein.

BACKGROUND AND SUMMARY OF THE INVENTION

The invention relates to a driver assistance system and method for outputting, as a function of certain conditions, at least one piece of information, in particular a warning, to the driver of a motor vehicle.

Modern vehicles have a plurality of driver assistance systems, by which a number of different functions for assisting the driver can be implemented. Some of these functions consist of outputting to the driver of the motor vehicle information, in particular a warning, under certain conditions. Such information can be output, for example, by optical, acoustical and/or haptic means.

In particular, in systems for warning the driver in safety critical situations, the conditions for outputting such a piece of information occur relatively infrequently in the normal operating mode of the motor vehicle, and/or the conditions cannot be created in a targeted manner by the operator of the motor vehicle.

Therefore, in case of an actual emergency (i.e., in the event of outputting a piece of information, in particular a warning) the driver of a motor vehicle, which is equipped with such a driver assistance system, may be surprised by the output of the information and therefore not in a position to react adequately to the information. The consequences may entail a number of drawbacks for the driver. First of all, an unfamiliar warning may frighten the driver in an unpleasant way or make the driver uncertain. Secondly, the reaction time of the driver may be increased, as compared to the ideal case, owing to his limited capacity to interpret an unknown or unusual piece of information. Thus, a safety critical situation could be created or intensified. In the worst case scenario, the driver could misinterpret a piece of outputted information and create or intensify a safety critical situation by his own disadvantageous operating reaction.

The invention provides a driver assistance system for a motor vehicle, which assists the driver in making a correct interpretation of a piece of information that is output by the driver assistance system to the driver.

The invention provides a driver assistance system for outputting, as a function of certain conditions, at least one piece of information, in particular a warning, to the driver. The driver assistance system can be transferred into a demonstration and/or learning mode, in which the conditions applied for outputting the piece of information are different from the normal mode of operation.

Preferably, the conditions for the output of information in the demonstration and/or learning mode are chosen in such a manner that the probability for the output of information is higher than in the normal mode of operation.

Preferably, in the demonstration and/or learning mode certain parameters of the signal processing process are varied, as compared to the normal mode of operation, by the driver assistance system. In the simplest case, for example, a triggering threshold for outputting a warning signal, may be lowered. As an alternative or in addition, time and/or geometric parameters may be varied; and/or the time and/or geometric scaling factors may be introduced or changed.

According to an advantageous further development of the invention, the demonstration and/or learning mode may be activated in a targeted manner by an operator, in particular by the driver. Preferably, the activation is made possible in a well-known manner by use of a push button, a multi-functional operating element, or a system for voice or gesture recognition.

According to another further development of the invention, all or selected parameters of the signal processing process may be varied continuously or in discrete gradations by an operator. In this way, a plurality of demonstration and/or learning modes and/or different gradations, for example sensitivity levels, of such a system can be actually implemented.

Preferably, the current mode of the driver assistance system is indicated to the driver by, for example, a light in an instrument cluster or by a text message or by a sound output.

Preferably, after the passage of a certain period of time following activation of the demonstration and/or learning mode or after the passage of a certain period of time following the time of the output of the last piece of information outputted within the demonstration and/or learning mode or after the next vehicle start, the driver assistance system transfers automatically again into the normal mode of operation. Instead of a period of time, a driven distance may be evaluated as an alternative or in addition. Such an automatic transition can prevent the driver from changing permanently the parameterization of the driver assistance system that the manufacturer consciously planned for the normal mode of operation.

Preferably, the demonstration and/or learning mode is automatically deactivated or re-parameterized when a high chronological density of information, outputted to the driver, occurs or can be expected. This method can suppress, for example, overwhelming the driver with irritations and/or can suppress a behavior of the driver assistance system that is deemed to be inconsistent from a subjective viewpoint.

Preferably, the driver assistance system transfers automatically into the normal mode of operation, when conditions arise or can be expected that envisage the output of a piece of information even in the normal mode of operation. This method ensures that important information is not concealed by the demonstration and/or learning mode.

The same purpose is also pursued by the following further development of the invention. Preferably, the information, output to the driver in the demonstration and/or learning mode, is slightly different, for example, through coloration in the event of a visual display, from the information that is output to the driver in the normal mode of operation. However, in this case the deviation must be designed to be so slight that the learning effect of the driver is not negatively affected. Preferably, there is a possibility for the driver's information to deviate from that in the demonstration and/or learning mode, as compared to the normal mode of operation.

According to another further development of the invention, all or selected parameters of the signal processing of an inventive driver assistance system that is already in a demonstration and/or learning mode, are varied again, if in a certain period of time or over a certain distance that was traveled no information had been outputted previously to the driver despite the activated demonstration and/or learning mode. Preferably, the driver assistance system transfers automatically from a first discrete sensitivity level to a second discrete sensitivity level exhibiting higher sensitivity. As an alternative, the sensitivity of the driver assistance system can be raised continuously up to and including the occurrence of the output of a piece of information to the driver.

In this way, the different vehicle handling characteristics and the varying joy of experimentation of different drivers can be accounted for. Consequently, a driver who is willing to take risks will perhaps experience the output of a piece of information as early as at the first sensitivity level, whereas a driver who is less willing to take risks may not perhaps experience the output until at a higher sensitivity level.

The invention allows the driver of a vehicle to become familiar with the basic, i.e., qualitative, behavior of the driver assistance system in a demonstration and/or learning mode. The experiences, gained in the demonstration and/or learning mode, enhance the driver's capability of correctly interpreting a piece of information, output by the driver assistance system in the normal mode of operation, and/or of reacting adequately to the piece of information.

DE 103 15 564 A1 discloses a motor vehicle with at least one device function, which is automatically activated at a certain driving speed, which is characterized in that the function can also be activated with the vehicle standing still in a demonstration mode by actuating at least two operating elements. However, the teaching of DE 103 15 564 A1 cannot be applied to the present technical problem, because, according to the invention, no targeted activation of the output of a piece of information to the driver is desired. Rather, only the conditions that are necessary for activating the output are changed, according to the present invention, in a quantitative respect.

The qualitative behavior of the driver assistance system, which consists, among other things, of outputting a piece of information as a function of certain conditions, is maintained.

Another advantage of the invention lies in the ability to use the learning and/or demonstration mode in a targeted manner for product information and/or sales promotion. The functions of modern driver assistance systems are greeted with great interest especially by potential buyers of vehicles. Therefore, it is advantageous for a vehicle dealer to be able to show the customer such a function in the showroom, on the company grounds, or during a short test drive. To this end, one function of the driver assistance system ought to be triggerable with high probability within a short period of time. This can be achieved by way of the invention.

Other objects, advantages and novel features of the present invention will become apparent from the following detailed description of the invention when considered in conjunction with the accompanying drawings.

BRIEF DESCRIPTION OF THE DRAWING

The FIGURE is a schematic representation of a driver assistance system according to a preferred embodiment of the present invention.

DETAILED DESCRIPTION OF THE DRAWING

Referring to the FIGURE, the driver assistance system 1 is used for outputting a collision warning, especially a rear end collision warning, to the driver of a motor vehicle, in which the driver assistance system 1 is installed.

The driver assistance system 1 exhibits a signal processing unit 2 and an output unit 3 for outputting information to the driver. The signal processing unit 2 is connected to internal sensors 4 and environment sensors 5 of the motor vehicle.

The following description of the function of the driver assistance system 1 is highly simplified.

The signals, received by the internal sensors 4 and the environment sensors 5, enter a motion model, which is present in the signal processing unit 2, of the motor vehicle and into motion models, which are also present in the signal processing unit 2, for objects in the environment of the motor vehicle.

With the aid of the motion models, the signal processing unit 2 assesses the risk of a collision of the motor vehicle with objects in its environment. Optionally, the signal processing unit 2 makes additional calculations about the time and/or type and/or seriousness of such a collision.

If the risk of a collision exceeds a certain threshold, the output unit 3 outputs a collision warning to the operator.

In the normal mode of operation the collision warning is outputted only if a collision occurs with a certain probability, for example 90 percent, within a time period of a certain length starting from the current time, for example within 2 seconds.

In the preferred embodiment, the driver can transfer the driver assistance system 1 into a demonstration mode by use of an operating element 6, which is also connected to the signal processing unit 2. A signal, such as light in the driver's field of vision, indicates to the driver the active state of the demonstration mode.

In this demonstration mode, the signal processing unit 2 receives and processes signals in essentially the same way as in the normal mode of operation. However, a collision warning is always output when a collision with an object in the environment of the vehicle occurs with a probability of 10 percent within a time period of 2 seconds starting from the current time.

Correspondingly, in the demonstration mode a collision warning is output to the driver more frequently than in the normal operating mode. In the demonstration mode, during a short test drive the driver can generate the output of a collision warning with high probability without having to put himself or other road users in a safety critical situation. Consequently, in the demonstration mode the driver can become familiar with the type of information that is offered, can become familiar with the qualitative behavior of the driver assistance system, and can learn to interpret a piece of information output in the normal operating mode, and can learn to react adequately to the information.

The above described variation of the probability threshold represents only a simple variant of an inventive transition from the normal operating mode into a demonstration mode. It is likewise within the scope of the invention to alternatively or additionally vary other parameters, for example, a variation of observed time horizons, a variation of the model parameters of the motion models, which are considered in the collision assessment, and/or a scaling of the sensor signals of the internal sensors 4 and the environment sensors 5 and/or the quantities calculated thereof.

In the event that the driver assistance system 1 is in the demonstration mode and—following activation of the demonstration mode—no collision warning was output to the driver over a certain distance of, for example, two kilometers, the conditions for outputting a collision warning are re-adjusted again, according to the preferred embodiment of an inventive driver assistance system that was described here. After this adjustment, a collision warning is always output when, within a time period of 2 seconds starting from the current time, a collision with an object in the environment of the vehicle occurs with a probability of 5 percent. This special embodiment of the demonstration mode is based on the consideration that the driver apparently wanted to experience the output of a piece of information by activating the demonstration mode, but is not willing to enter into a high safety risk situation for this purpose. Therefore, after a certain distance the driver assistance system adjusts, to this effect, its own sensitivity to the driver's potentially low willingness to take on a risk.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for a driver of a motor vehicle, comprising:
   a driver assistance system that outputs, as a function of certain conditions, at least one piece of information to the driver of the motor vehicle;
   wherein the driver assistance system has a normal mode of operation and at least one of a demonstration and learning mode of operation, the driver assistance system being transferable into the at least one of the demonstration and learning mode of operation in which the conditions applied for outputting the at least one piece of information to the driver are different from the conditions applied for outputting the at least one piece of information to the driver in the normal mode of operation.

2. The system according to claim 1, wherein the at least one piece of information is warning information.

3. The system according to claim 1, wherein the conditions for outputting information in the at least one of the demonstration and learning mode are selected such that a probability for outputting the information is higher than in the normal mode of operation.

4. The system according to claim 2, wherein the conditions for outputting information in the at least one of the demonstration and learning mode are selected such that a probability for outputting the information is higher than in the normal mode of operation.

5. The system according to claim 1, wherein in the at least one of the demonstration and learning mode of operation, certain parameters of a signal processing process employed by the driver assistance system are varied compared to the normal mode of operation of the driver assistance system.

6. The system according to claim 3, wherein in the at least one of the demonstration and learning mode of operation, certain parameters of a signal processing process employed by the driver assistance system are varied compared to the normal mode of operation of the driver assistance system.

7. The system according to claim 1, further comprising an operating element operatively coupled with the driver assistance system to allow for manual activation of the at least one of the demonstration and learning mode of operation of the driver assistance system.

8. The system according to claim 2, further comprising an operating element operatively coupled with the driver assistance system to allow for manual activation of the at least one of the demonstration and learning mode of operation of the driver assistance system.

9. The system according to claim 3, further comprising an operating element operatively coupled with the driver assistance system to allow for manual activation of the at least one of the demonstration and learning mode of operation of the driver assistance system.

10. The system according to claim 5, further comprising an operating element operatively coupled with the driver assistance system to allow for manual activation of the at least one of the demonstration and learning mode of operation of the driver assistance system.

11. The system according to claim 1, wherein at least one parameter of a signal processing process employed by the driver assistance system is variable continuously or in discrete gradations via an operator.

12. The system according to claim 3, wherein at least one parameter of a signal processing process employed by the driver assistance system is variable continuously or in discrete gradations via an operator.

13. The system according to claim 5, wherein at least one parameter of a signal processing process employed by the driver assistance system is variable continuously or in discrete gradations via an operator.

14. A method of operating a driver assistance system that outputs, as a function of certain conditions, at least one piece of information to a driver of a motor vehicle, the method comprising the acts of:
   operating the driver assistance system in a normal mode of operation, in which the at least one piece of information is output to the driver as a function of certain conditions; and
   transferring the driver assistance system into at least one of a demonstration and learning mode of operation, in which at least one of the certain conditions applied for outputting the piece of information to the driver differs from its condition in the normal mode of operation.

15. The method according to claim 14, wherein the at least one piece of information is a warning to the driver of the motor vehicle.

16. The method according to claim 15, further comprising the act of selecting the at least one condition for the output of information in the at least one of the demonstration and learning mode of operation such that a probability for outputting the information is higher than in the normal mode of operation.

17. The method according to claim 15, further comprising the act of varying certain parameters of a signal processing process employed by the driver assistance system in the at least one of the demonstration and learning mode of operation in comparison to the normal operating mode of the driver assistance system.

18. The method according to claim 15, further comprising the act of activating the at least one of the demonstration and learning mode of operation in a targeted manner.

19. The method according to claim 15, further comprising the act of varying either continuously or in discrete gradations one or more parameters of a signal processing process employed by the driver assistance system.

* * * * *